(12) United States Patent
Mango

(10) Patent No.: US 10,853,787 B1
(45) Date of Patent: Dec. 1, 2020

(54) UNIVERSAL FARE PAYMENT AND COLLECTION SYSTEM

(71) Applicant: Moua Branckay Cesar Serge Mango, Saint Martin (FR)

(72) Inventor: Moua Branckay Cesar Serge Mango, Saint Martin (FR)

( * ) Notice: Subject to any disclaimer, the term of this patent is extended or adjusted under 35 U.S.C. 154(b) by 310 days.

(21) Appl. No.: 15/949,760

(22) Filed: Apr. 10, 2018

Related U.S. Application Data

(60) Provisional application No. 62/504,185, filed on May 10, 2017.

(51) Int. Cl.
*G06Q 20/32* (2012.01)

(52) U.S. Cl.
CPC .......... *G06Q 20/322* (2013.01); *G06Q 20/327* (2013.01); *G06Q 2240/00* (2013.01)

(58) Field of Classification Search
CPC .......................... G06Q 20/327; G06Q 20/322
See application file for complete search history.

(56) References Cited

U.S. PATENT DOCUMENTS

| | | | |
|---|---|---|---|
| 5,590,038 A | 12/1996 | Pitroda | |
| 5,590,197 A | 12/1996 | Chen et al. | |
| 5,734,722 A | 3/1998 | Halpern | |
| 6,386,451 B1 | 5/2002 | Sehr | |
| 7,036,732 B2 | 5/2006 | Hilton et al. | |
| 8,788,418 B2 | 7/2014 | Spodak et al. | |
| 9,311,640 B2 | 4/2016 | Filler | |
| 9,317,818 B1 | 4/2016 | Sarvestani et al. | |
| 2004/0149820 A1 | 8/2004 | Zuili | |
| 2008/0201212 A1 | 8/2008 | Hammad et al. | |
| 2010/0070312 A1 | 3/2010 | Hunt | |
| 2010/0153279 A1 | 6/2010 | Zahn | |
| 2011/0000962 A1 | 1/2011 | Chan et al. | |
| 2013/0030964 A1* | 1/2013 | Nuzzi | G06Q 30/04 705/30 |
| 2014/0244495 A1 | 8/2014 | Davis et al. | |
| 2014/0278062 A1* | 9/2014 | Han | G08G 5/045 701/423 |

(Continued)

FOREIGN PATENT DOCUMENTS

| | | |
|---|---|---|
| EP | 3109818 | 12/2016 |
| KR | 20160022431 | 3/2016 |

OTHER PUBLICATIONS

Android Application for Ticket Booking and Ticket Checking in Suburban Ralways (Year: 2015).*

*Primary Examiner* — Jeff Zimmerman
*Assistant Examiner* — Zeina Elchanti
(74) *Attorney, Agent, or Firm* — Emerson Thomson Bennett, LLC; Daniel A. Thomson

(57) ABSTRACT

A universal fare payment and collection system configured to allow users to purchase tickets and/or passes for a plurality of public transport authorities using a single account or device. The system is configured to detect a first ticketing technology of a first nearby transportation system, configure the traveler's electronic device for authorizing at least one of a ticket and a pass via the first ticketing technology, detect a second ticketing technology of a second nearby transportation system, the second ticketing technology being different from the first ticketing technology, and configure the traveler's electronic device for authorizing at least one of a ticket and a pass via the second ticketing technology.

20 Claims, 14 Drawing Sheets

(56) References Cited

U.S. PATENT DOCUMENTS

2016/0360352 A1* 12/2016 Khan ................. H04W 4/80
2017/0206521 A1*  7/2017 Maddocks .......... G06Q 20/102
2019/0385265 A1* 12/2019 Liu ................... H04W 4/029

* cited by examiner

UNIVERSAL FARE PAYMENT AND COLLECTION SYSTEM

CROSS-REFERENCE TO RELATED APPLICATION

This application claims the benefit of U.S. Provisional Patent Application Ser. No. 62/504,185, filed May 10, 2017, which is incorporated herein in its entirety.

FIELD OF THE INVENTION

The present invention relates generally to fare payment and collection systems, and more particularly to a universal fare payment and collection system.

BACKGROUND OF THE INVENTION

It is common for individuals to travel via public transportation. For example, individuals may use subway or bus systems or use a taxicab service. Individuals may buy a transportation pass for using a public transportations system.

However, currently available public transportation systems have problems that need to be solved. For example, it is not possible to board different public transportation systems with one pass, since each transport authority has its own closed fare payment and collection system. Therefore, individuals are frequently inconvenienced with needing to buy multiple travel passes for traveling on multiple transportation systems.

The following four systems attempt to solve the above problems but have their own technical problems and issues:

1) Masabi simplifies ticketing and streamlines fare collection, validation and management for public transportation providers. However, Masabi provides a white labeled solution that integrates specifically on a 1-1 basis. For a new public transportation authority to implement Masabi's solution—they must work directly with Masabi to create a customized white label mobile application that only works with 1 specific public transport authority (PTA). The limitation to their offering is that it does not provide an overarching platform to allow users to ride various PTAs via the same mobile app. In other words, the white labeled mobile app will only be compatible with the PTA it was specifically built for. To allow the user to gain access to another PTA, a separate Masabi mobile app would be required to be built.

2) Gemalto Pure is an off the shelf payment application from Gemalto and is fully compliant with Europay Mastercard and Visa (EMV) standards. Gemalto Pure offers white label services for closed loop card issuers. However, the Gemalto Pure offering is complex in nature which would require and include major infrastructure and custom development to integrate with fully compliant EMV standards. The limitation again is that using this white label solution only provides access to a single PTA and not universal access to a myriad of readers. Furthermore, Gemalto Pure does not provide the implementation of a mobile app.

3) Apple/Android/Samsung Pay allow for users to upload their credit cards digitally to communicate with near field communications (NFC) directly to point of sales. However, the limitation is that most card readers in PTAs today do not directly accept these protocols. Thus when dealing with a card reader that does not support these NFC payment methods, no access will be granted. In other words, using these protocols alone will only provide access to a small subset of PTAs and not universal access.

4) GlobeSherpa (now moovel transit) is a suite of white-labeled mobile ticketing and payment solutions. GlobeSherpa helps transit apps connect with the rest of the transportation ecosystem. However, the limitation again comes down to the inability of a single application to integrate universally over all the PTAs globally.

Accordingly, there exists a need for an effective universal fare payment and collection system that solves the problems and overcomes the limitations of the above described systems.

SUMMARY OF THE INVENTION

This summary is provided to introduce a selection of concepts in a simplified form that are further described below in the detailed description. This summary is not intended to identify key features of essential features of the claimed subject matter, nor is it intended to be used to limit the scope of the claimed subject matter. Furthermore, the claimed subject matter is not limited to implementations that solve any or all disadvantages noted in any part of this disclosure.

Disclosed is a universal fare payment and collection system, the system comprising one or more storage machines holding instructions executable by one or more logic machines to, at a traveler's electronic device, detect a first ticketing technology of a first nearby transportation system, configure the traveler's electronic device for authorizing a ticket via the first ticketing technology, at the traveler's electronic device, detect a second ticketing technology of a second nearby transportation system, the second ticketing technology being different from the first ticketing technology, and configure the traveler's electronic device for authorizing a ticket via the second ticketing technology.

In another aspect, the nearby transportation system is determined via a GPS subsystem.

In another aspect, first and second ticketing technologies are one of NFC technology, contactless card reader technology, and a Bluetooth technology.

In another aspect, the system executes an algorithm to detect or determine a specific ticketing technology.

In another aspect, the nearby transportation systems are each in different public transportation authorities (PTAs).

In another aspect, the system allows a user to pay for tickets or passes of each of the transportation authorities.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

Figure 1:
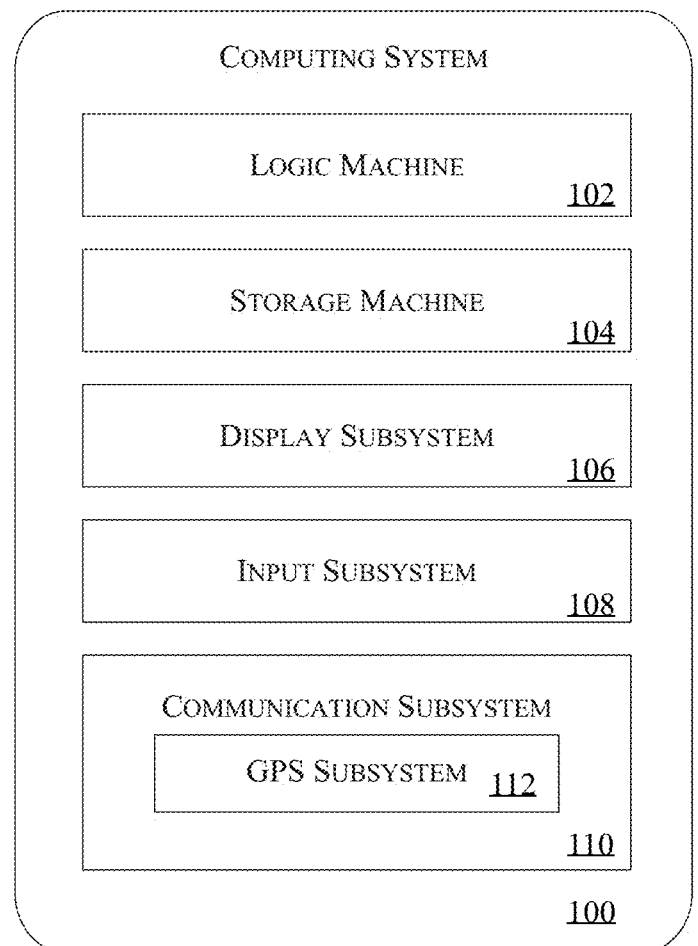
FIG. 1 schematically presents an exemplary computing system in accordance with aspects of the present disclosure.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise. It is to be understood that each of the below methods may be executed in order as presented below, or in any appropriate order.

Disclosed is a universal fare payment and collection system. The system may comprise one or more storage machines holding instructions executable by one or more logic machines to carry out tasks and methods described herein. For example, the instructions may be executable by the system or sub-systems to carry out methods shown in the figures.

The herein disclosed universal fare payment and collection system may be referred to as PASSEKO.

Figure 8:
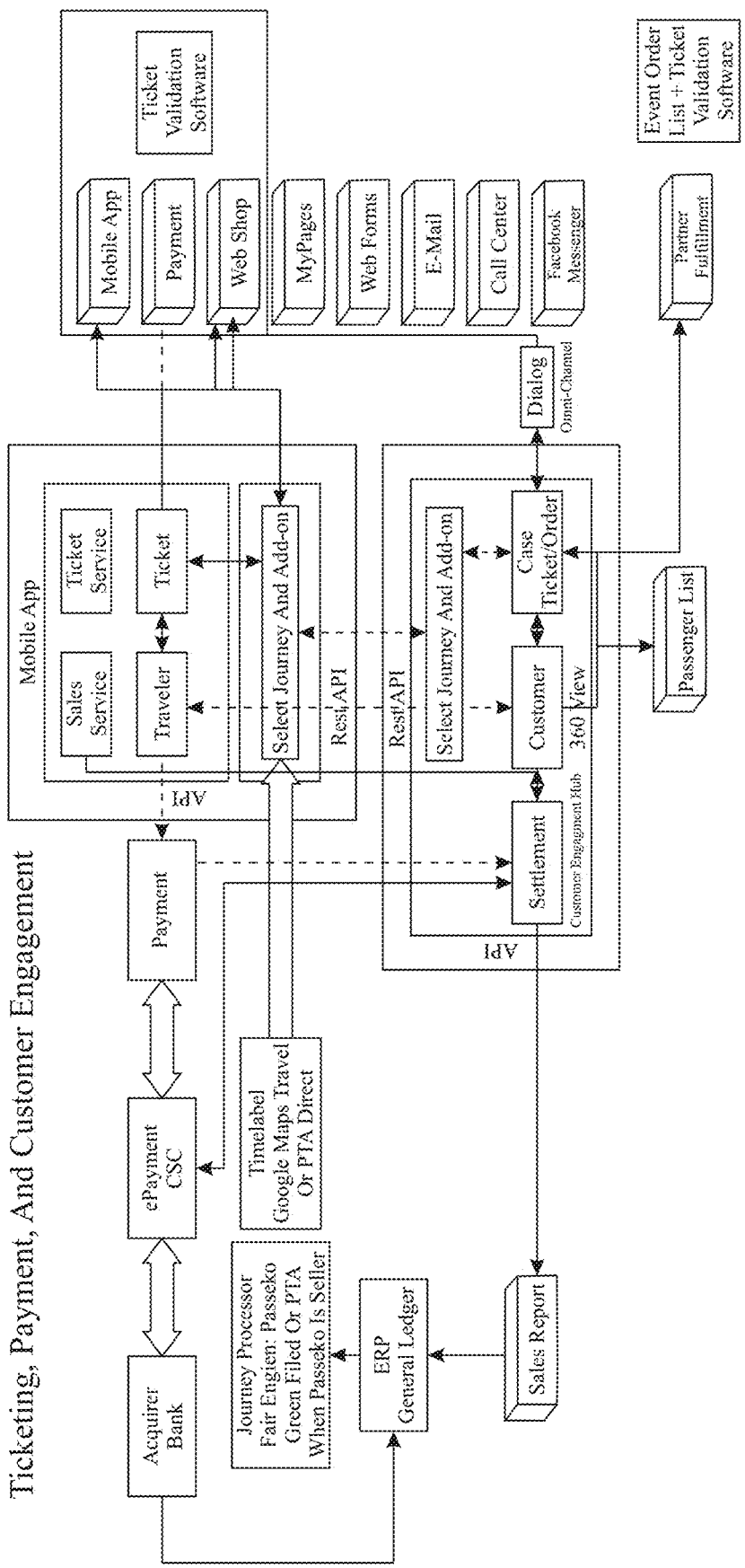
FIG. 8 schematically presents a sub-system for ticketing, payment, and customer engagement in accordance with aspects of the present disclosure.
Figure 9A:
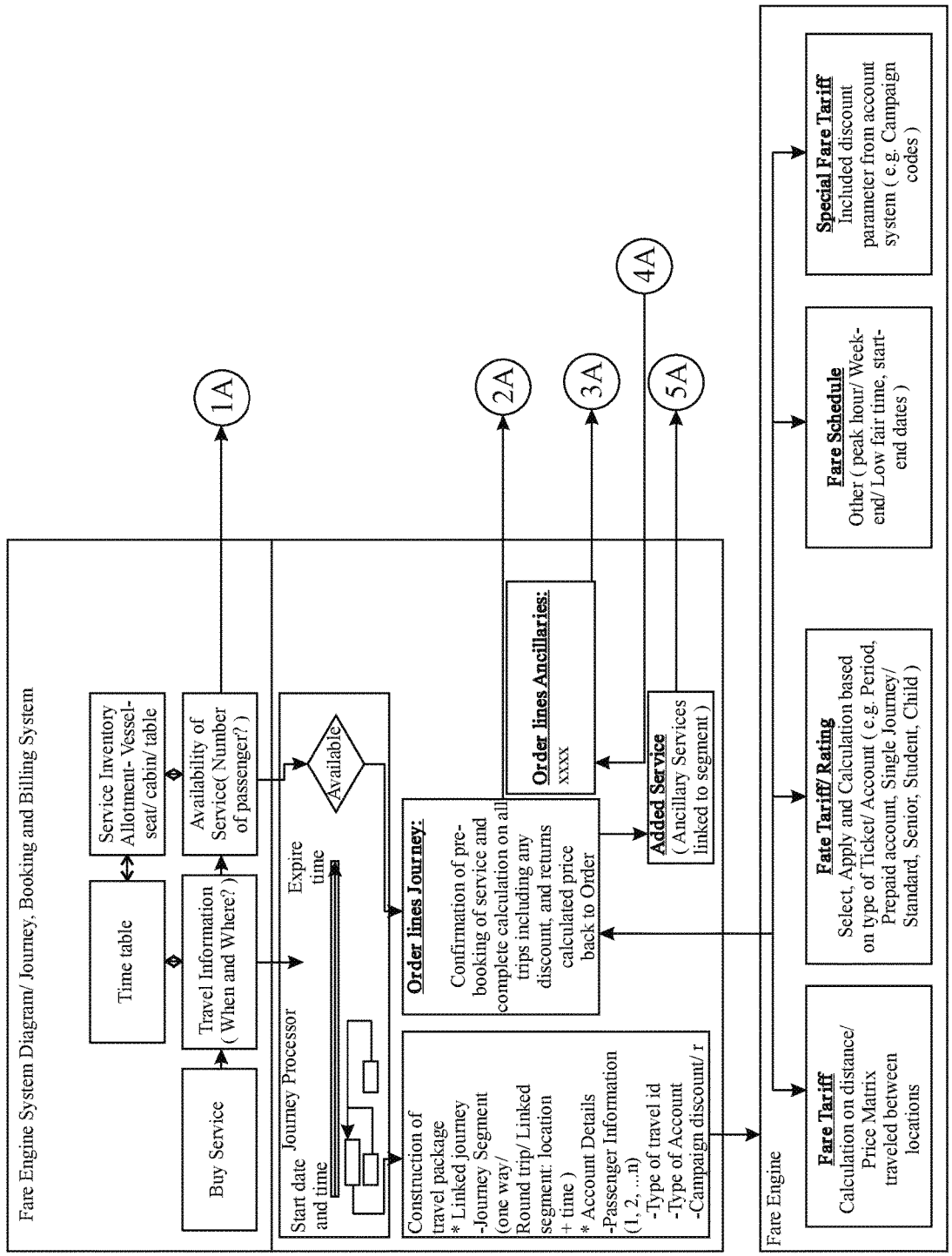
FIGS. 9A and 9B schematically present a sub-system for booking and billing tickets, in accordance with aspects of the present disclosure.
Figure 9B:
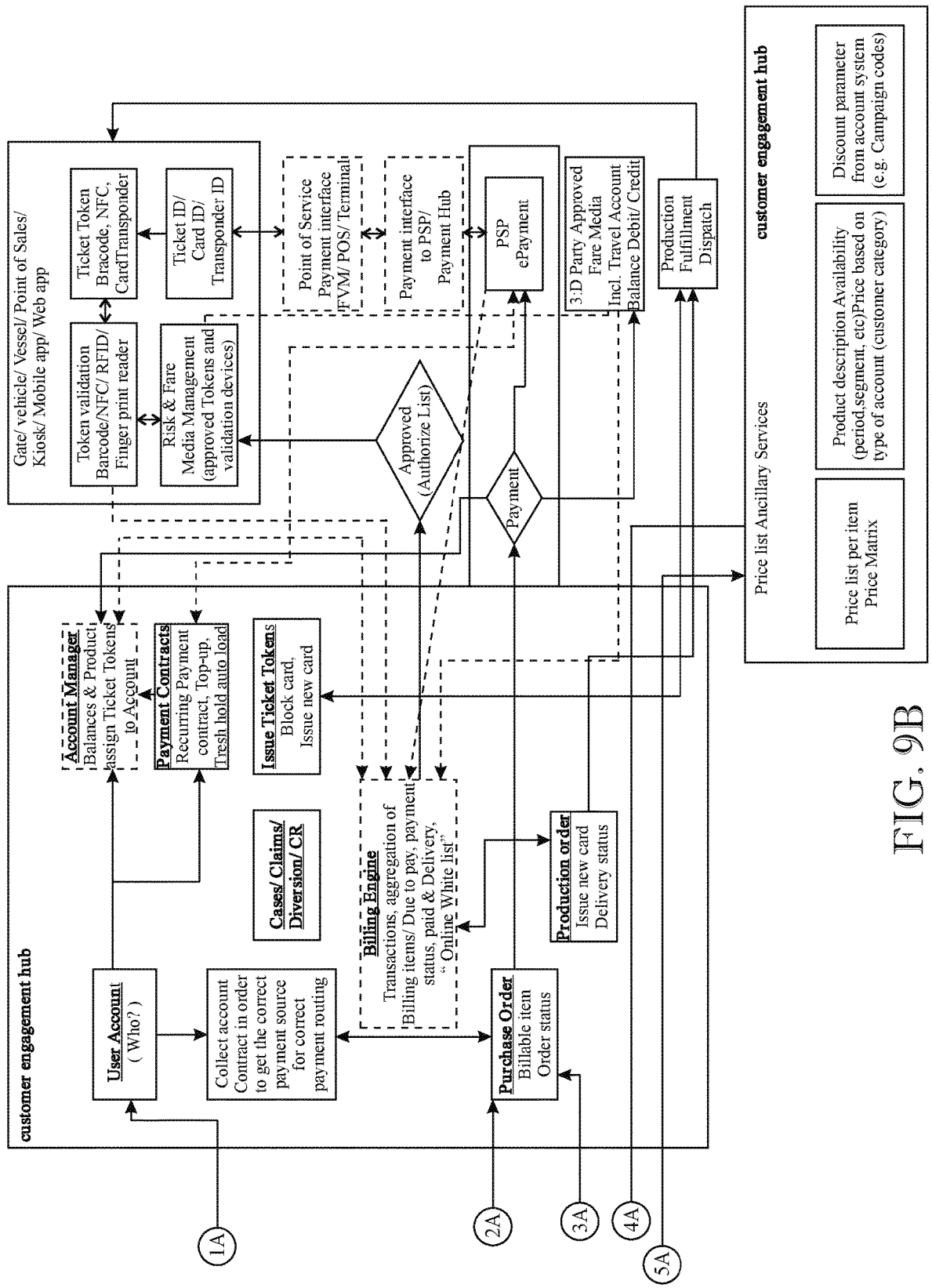
Figure 10:
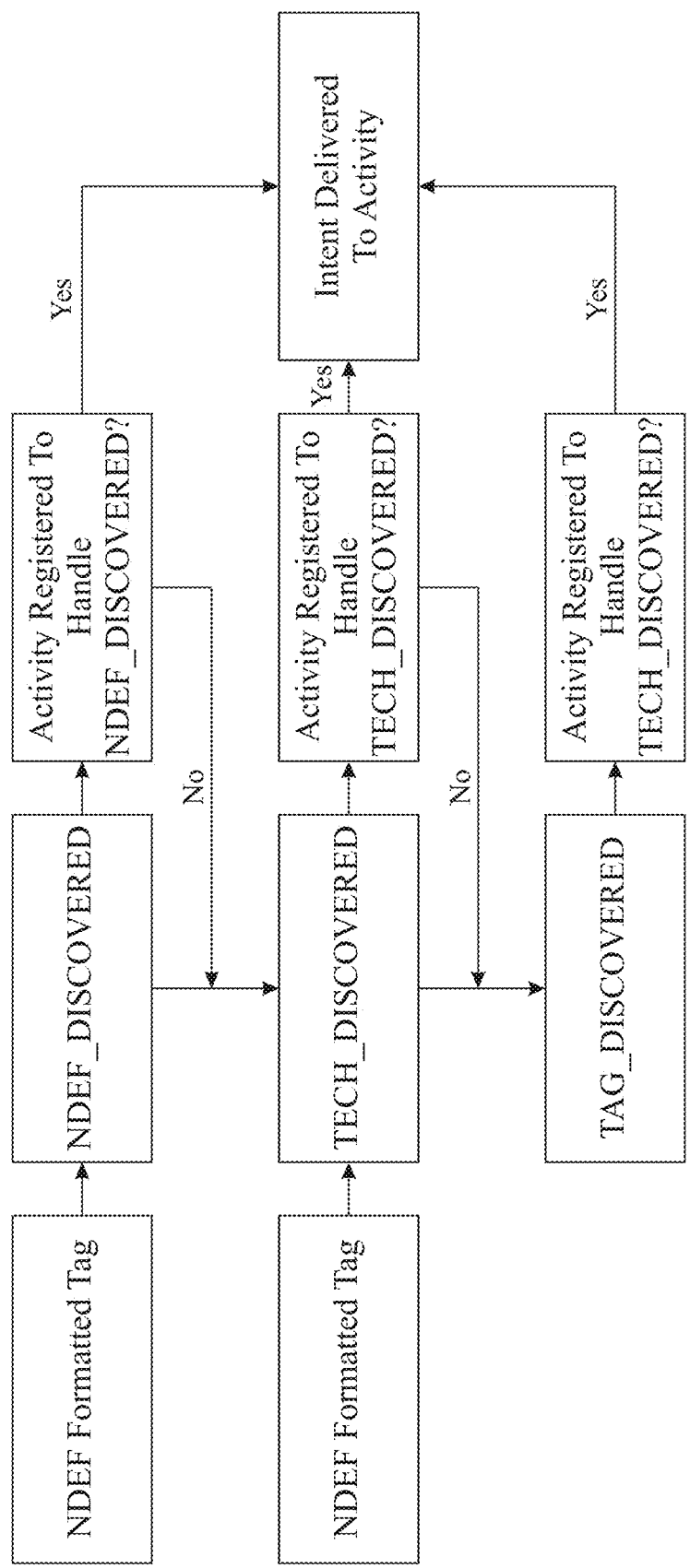
FIG. 10 schematically presents a flow of NFC data from a terminal to a mobile application, in accordance with aspects of the present disclosure.
Figure 11:
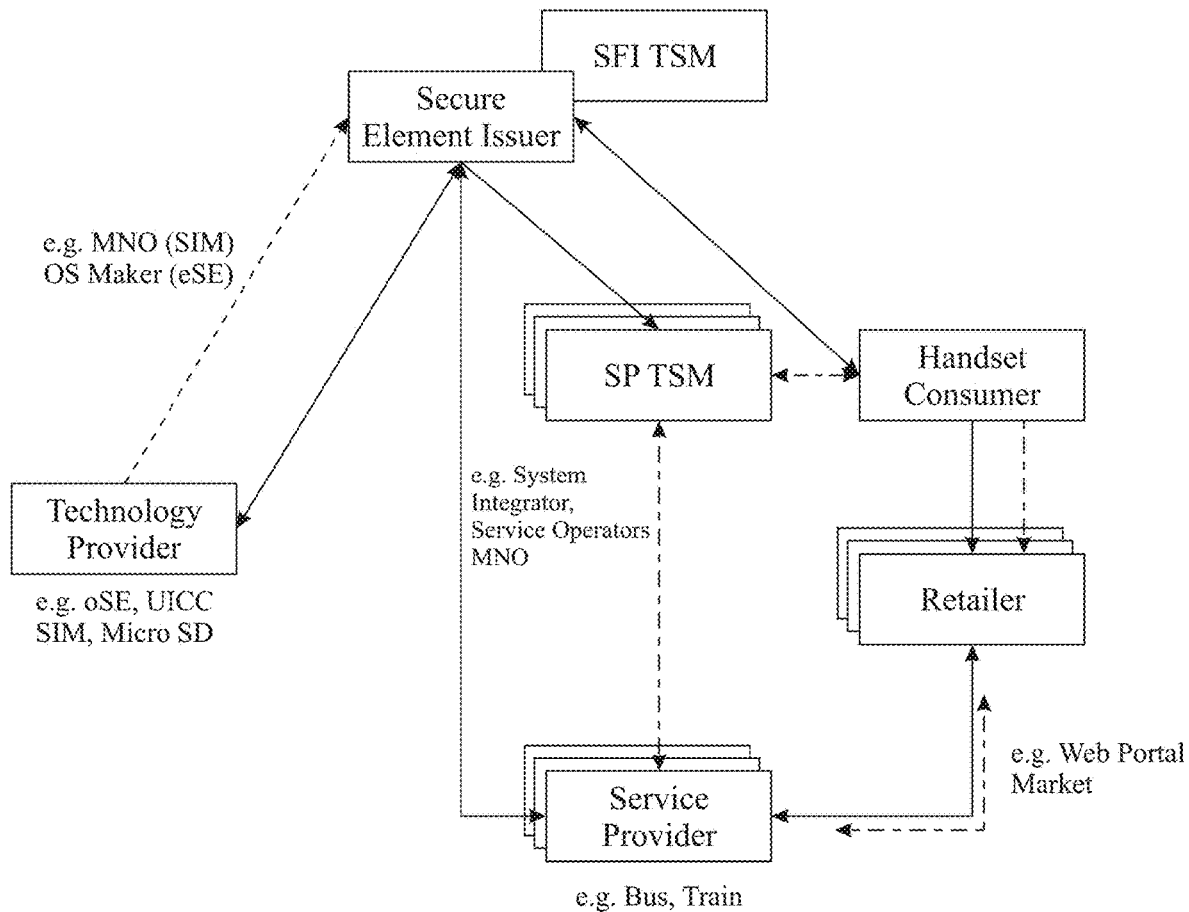
FIG. 11 schematically presents a high level flow to issue a secure element, in accordance with aspects of the present disclosure.
Figure 12:
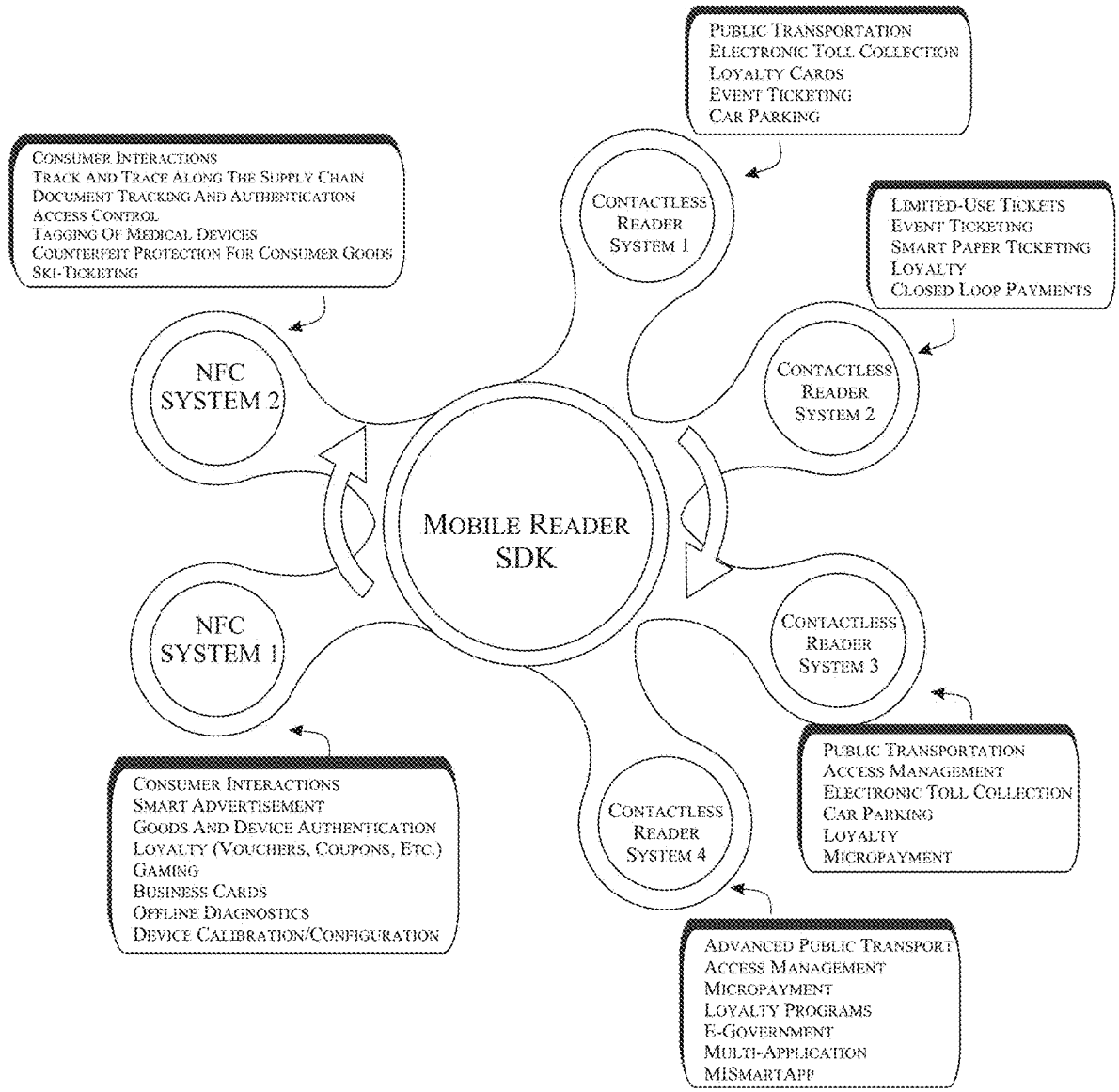
FIG. 12 schematically presents a mobile SDK configured to allow contactless reader communication with various systems, in accordance with aspects of the present disclosure.
Figure 13A:
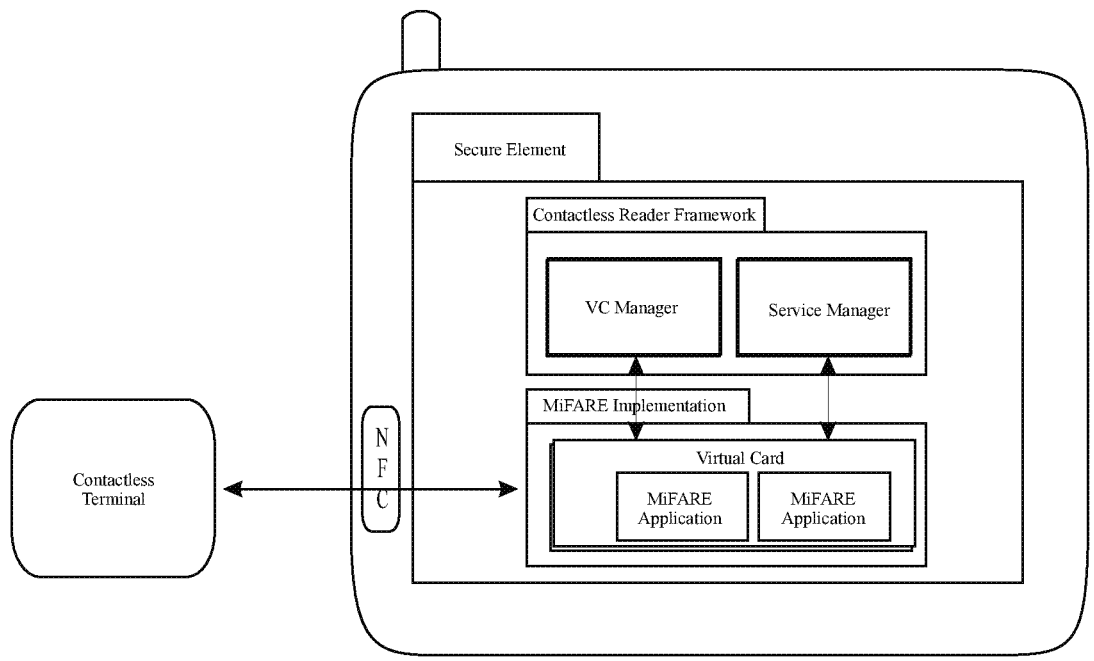
FIG. 13A schematically presents a high level system view of a secure element and contactless reader framework in a mobile device, in accordance with aspects of the present disclosure.
Figure 13B:
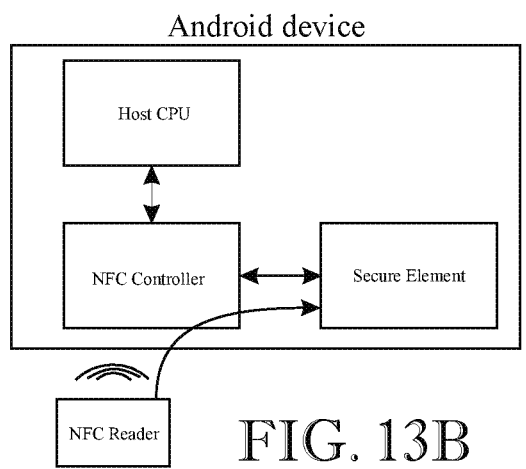
FIG. 13B schematically presents an NFC communication sub-system with a secure element, in accordance with aspects of the present disclosure.
Figure 13C:
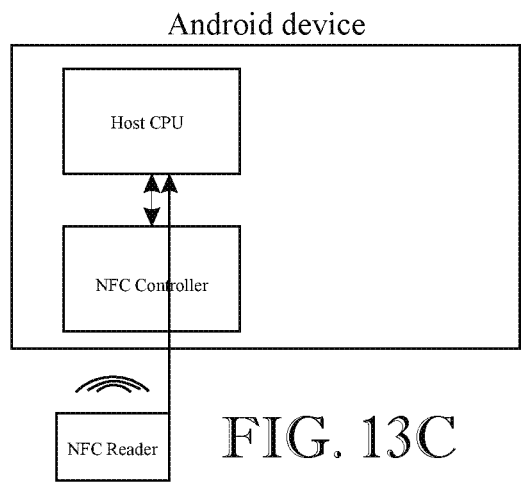
FIG. 13C schematically presents an NFC communication sub-system without a secure element, in accordance with aspects of the present disclosure.

The system may include any appropriate sub-system or sub-method to carry out the tasks. For example, FIG. 8 schematically presents a sub-system for ticketing, payment and customer engagement, FIGS. 9A and 9B schematically present a sub-system for booking and billing tickets, FIG. 10 schematically presents a flow of NFC data from a terminal to a mobile application, FIG. 11 schematically presents a high level flow to issue a secure element, FIG. 12 schematically presents a mobile SDK configured to allow contactless reader technology communication with various systems, FIG. 13A schematically presents a high level system view of a secure element and a contactless reader technology framework in a mobile device, FIG. 13B schematically presents an NFC communication sub-system with a secure element, and FIG. 13C schematically presents an NFC communication sub-system without a secure element.

Figure 2:
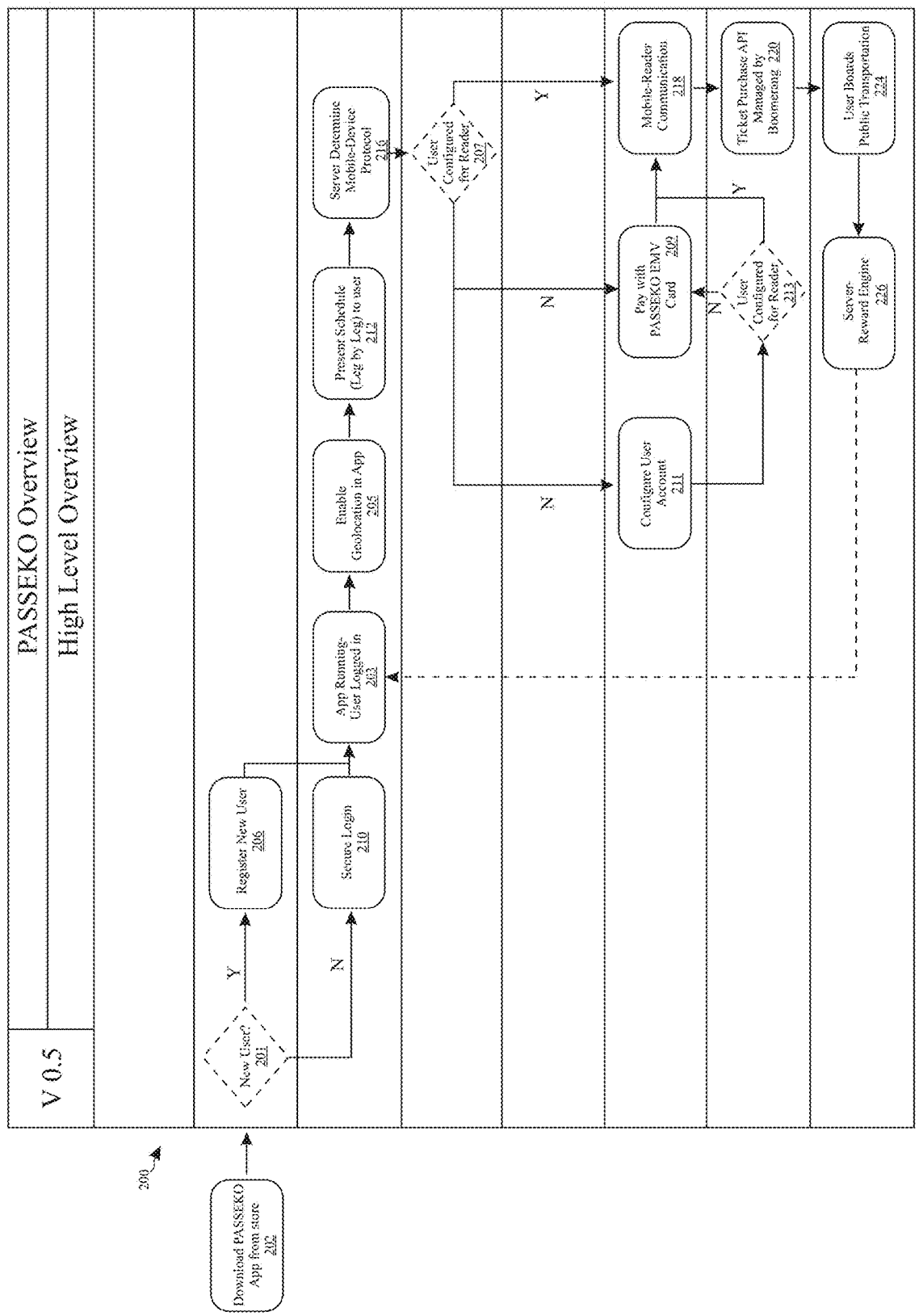
FIG. 2 schematically presents a high level overview of a universal fare payment and collection method in accordance with aspects of the present disclosure.

Turning to FIG. 2, method 200 may include at 202 providing a mobile application (app) on Google Play or Apple App Store for a user to download and downloading the mobile application onto a mobile phone, at 206 registering to use the mobile application from inside the app and creating a username, password, and/or access credentials for using the application, at 216 receiving, identifying or determining a payment method for purchasing global transportation tickets or passes (e.g. ACH, credit card number, Apple Pay, Android Pay, Samsung pay), at 210 logging-in a user to the mobile application for viewing nearest public transportation services using GPS, at 212 accessing and/or displaying a schedule and/or hours of operation for a transportation service (train, subway, or bus), and/or displaying a price of a ticket for a selected schedule item, and at 220 purchasing a ticket with the mobile application from the schedule.

Figure 3:
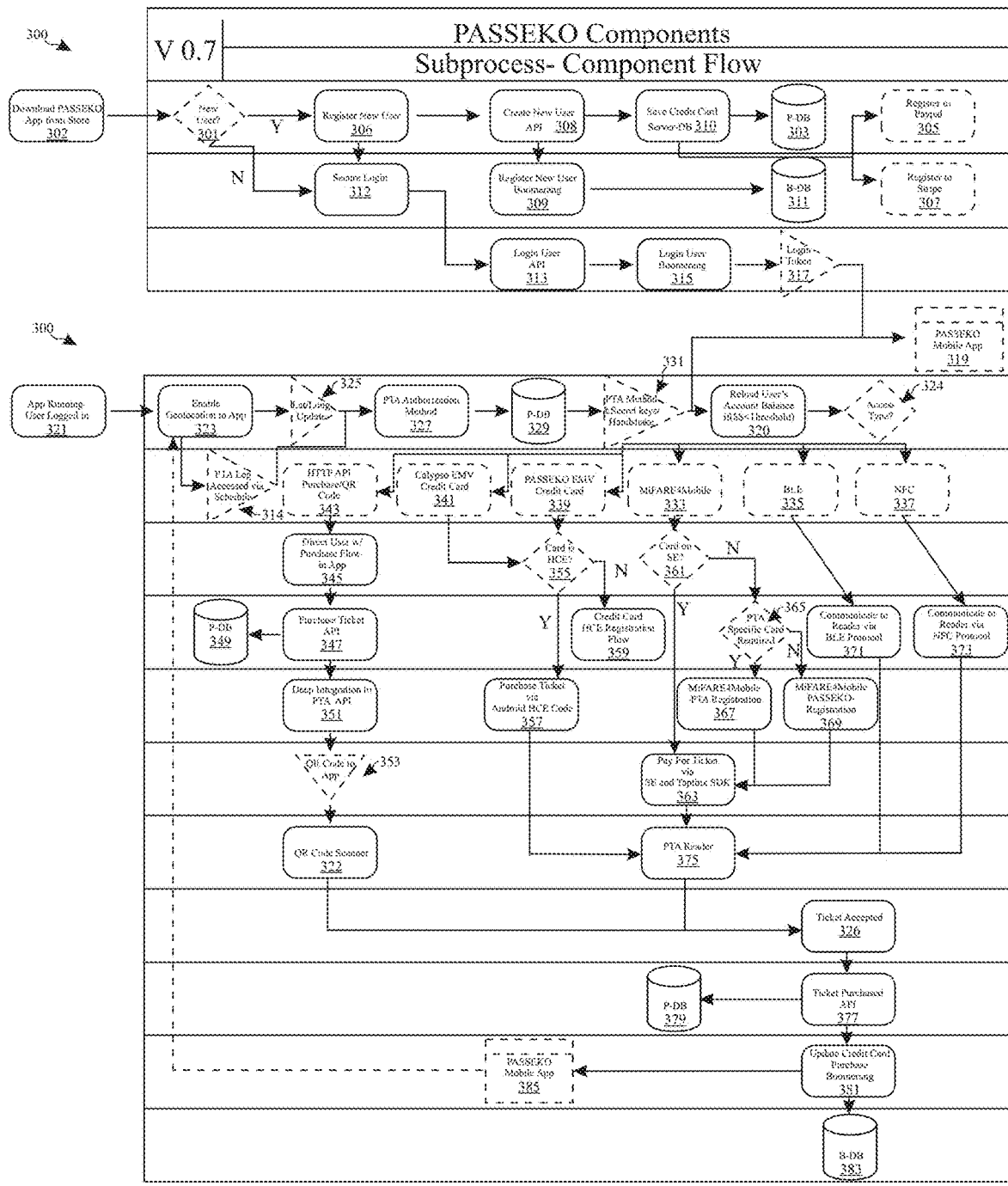
FIG. 3 schematically presents a subprocess component flow method of the universal fare payment and collection method in accordance with aspects of the present disclosure.

Turning to FIG. 3, at 320 method 300 may include indicating a preferred method of payment.

Turning back to FIG. 2, method 200 may include at 220 upon entering a public transportation service (e.g. a user may enter), presenting or displaying ticket presentment (validation) options available at a specific or selected location, at 218 in response to a tap and go function of the mobile app or mobile phone, reading a purchased ticket for allowing a user to board selected public transportation (e.g. by activating a contactless reader), and at 224 confirming that the ticket was accepted.

Figure 5:
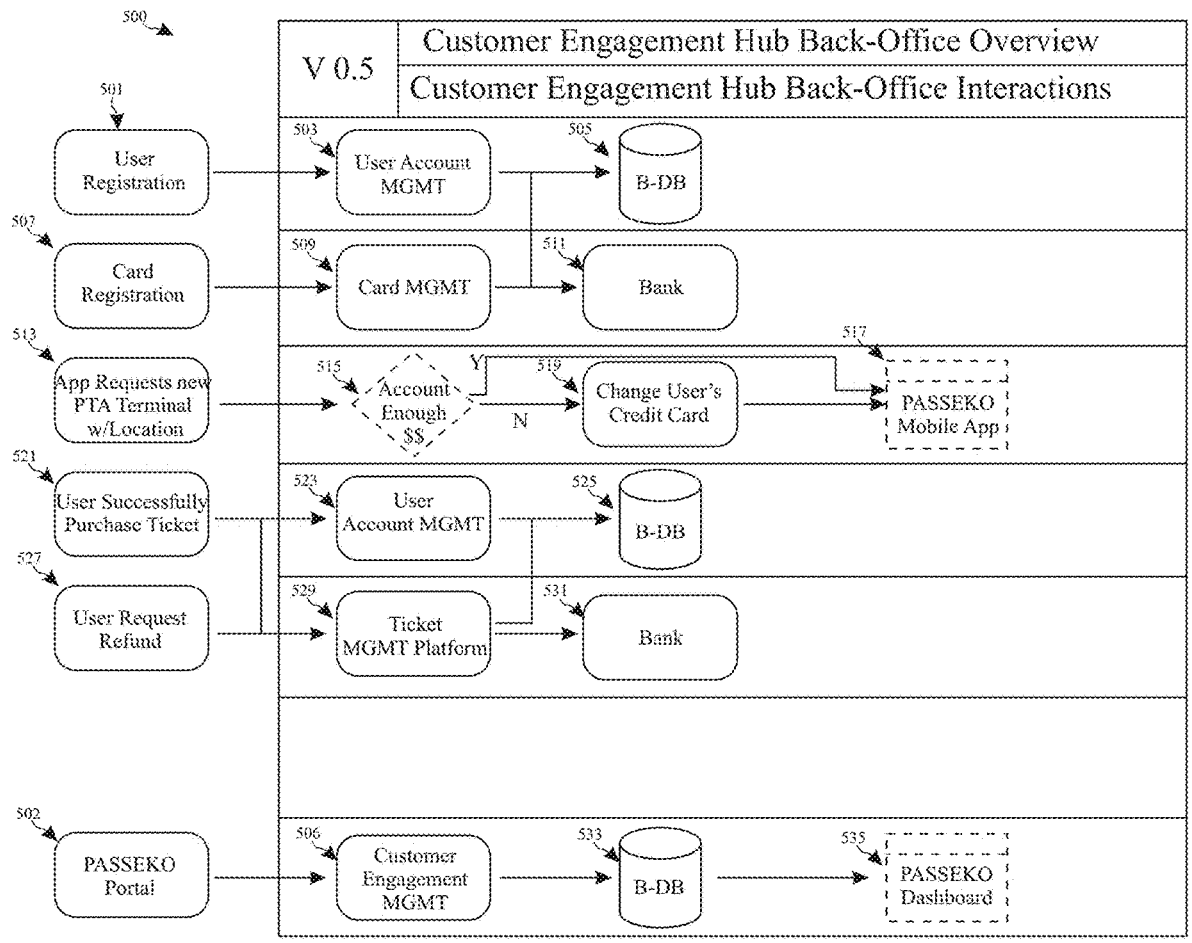
FIG. 5 schematically presents a back office overview for a customer engagement hub subsystem in accordance with aspects of the present disclosure.

Turning to FIG. 5, method 500 may include at 506 providing, displaying, presenting, or viewing a history of ticket purchases made via the mobile application, further at 506 providing, displaying, presenting, or viewing an amount of funds withdrawn from the user's payment account, further at 506 providing, displaying, presenting, or viewing unused and/or available tickets associated with a user's account, and further at 506 providing, displaying, presenting, or viewing special offers and rewards associated with the use of the mobile application for fare payment.

Turning back to FIG. 2, method 200 may include at 226 providing validation of distance traveled by using a checkout process available within some public transport services.

Turning back to FIG. 5, method 500 may further include at 506 contacting customer service through the mobile app in response to a user input.

Further details of FIG. 2 will now be described. At 201, the system may first determine if a user is a new user. At 206, if the user is a new user, the mobile application prompts a user to register a new account. At 210, if the user is not a new user, the user may log in securely. At 203 a user is logged in while the app is running. At 205 geolocation is enabled in the app. At 212 a schedule is presented to a user (e.g. leg by leg). At 216, a server determines a mobile-device protocol. At 207, a user is configured for an appropriate reader. At 209, the method includes paying with an EMV card, at 211 a user account is configured, and at 218 a mobile reader communication is initialized or executed. At 213 a user may be configured for a reader before paying via EMV at 209. At 220, a ticket purchase API is managed by a customer engagement hub as described in more detail below. At 224, the user boards public transportation according to a purchased ticket. At 226, a server-reward engine is initialized or executed.

Further details of FIG. 3 will now be described. At 301 the method determines if a user is a new user, at 306 a new user is registered, and if the user is already registered, at 312 the user is logged in securely. Subsequent to registering a new user, at 308 a new user API is created, at 310 a credit card is saved in a first database (DB1) at 303. Additionally or alternatively, after credit card info is saved, the method may continue to register the user account and/or credit card to PayPal at 305 or stripe at 307. Further, after creating a new user API at 308, the method may continue to register a new user using a customer engagement hub at 309, and storing the registration in a second database (DB2) at 311. The second database DB2 may be part of the customer engagement hub system. Turning back to logging in a user at 312, after a user is logged in a login API may be created and/or executed and/or displayed at 313, and at 315 a user may be logged into a customer engagement hub. At 317, a login token is generated, and the login token may be passed to, or used to log in to, a front-end of the mobile app at 319.

Even further details of FIG. 3 will now be described. At 321, the app is running and a user is logged in. At 323 geolocation is enabled in the app and at 325 latitude/longitude updates are executed. At 314, a PTA leg is accessed via a schedule. At 327 a PTA Authorization method is determined. At 329, DB2 receives one or more of the preceding information in the flow, and at 331 a PTA method and secret keys and/or handshake is determined and/or registered. Information processed at 331 may then be relayed to the front-end of the mobile app at 319. At 320, the method may continue from 331 to reload a user's account balance (e.g. if an amount of money in the user's account is less than a predetermined threshold value). At 324 an access type is determined. For example, at 333 the access type is a contactless reader, at 335 the access type is a BLE system, and at 337 the access type is an NFC system. Further, at 339 the access type is an EMV credit card, and at 341 an electronic ticketing standard microprocessor for contactless smart cards. At 343, an HTTP API Purchase or QR code is generated and used to direct a user at 345 to a purchase ticket API. The purchase ticket API information may be processed at 347 and sent to DB1 at 349. At 351, deep integration to a PTA API is executed, and at 353 a QR code is sent to the mobile application. At 322 a QR code scanner scans the QR code and at 326 a ticket is accepted.

Turning back, at 355 in FIG. 3 the system determines if a card is configured for host card emulation (HCE). If the card is determined to be HCE configured, then at 357 a ticket is purchased via an android HCE code. If the card is determined as not being HCE, at 359 a credit card HCE registration flow is executed. Turning back, at 361 it is determined if a card is on a secure element, and at 363 a ticket is paid for via a secure element and a contactless reader SDK. For example, a secure element may be a secure microcontroller capable of securely hosting applications and their confidential and/or cryptographic data (e.g. key management). If the card is determined as not being on a secure element, at 365 it is determined if a PTA specific card is required. If a PTA specific card is required, at 367 a contactless card reader registration is made specifically for the specific PTA. At 369, a general contactless card reader registration is made for the disclosed system. Turning back, at 371 data is communicated to a reader via BLE protocol, and at 373 data is communicated to a reader via NFC protocol. Data processed at steps 357, 371, and/or 373 may be relayed to a PTA reader at 375. At 326 a ticket is accepted and then at 377 a ticket is purchased through an API and appropriate information is passed to DB1 at 379. At 381 a credit card purchase is updated through a customer engagement hub and subsequently appropriate information is sent to DB2 at 383 and a front-end of the mobile app at 385.

It is to be understood that a Secure Element (SE) may be a tamper-resistant platform capable of securely hosting applications and their confidential and cryptographic data in accordance with the rules and security requirements set forth by a set of well-identified trusted authorities. Put simply, a Secure Element can be considered a chip that offers a dynamic environment to store data securely, process data securely and perform communication with external entities securely. A SE may self destruct upon being tampered with, and/or be configured to block unauthorized access.

To provide security to NFC applications that involve financial transactions, the Secure Element may reside in highly secure cryto chips. The secure element may provide delimited memory for each application stored in it and other functions that can encrypt, decrypt and sign the data packet.

In smartphones, a Secure Element may be located as a chip embedded directly into a phone's hardware, or in a SIM/UICC card provided by a network operator or in an SD card that can be inserted into mobile phone.

Using an NFC enabled mobile device to "tap and pay", an NFC controller of the device may change into card-emulation mode. In one example, the NFC controller itself may not deal with data or processing associated with a payment transaction. The NFC controller may be an interface that allows communication using standard protocols.

The Secure Element emulates a contactless card. The secure element may perform a handshake with a terminal, sends correct responses to correct or appropriate queries, generates dynamic cryptograms, and authenticates a stored card. In some examples, the Secure Element may not emulate the contactless card. Software that emulates a contactless card may be one that is stored inside the secure element in the form of payment applications or applets. The Secure Element provides secure storage and execution environment for the payment applications to do their job.

It is to be understood that a Secure Element may or may not be included in the disclosed system. Host-based Card Emulation (HCE) may be implemented to move a secure storage and execution environment to a cloud instead of the Secure Element.

Figure 4:
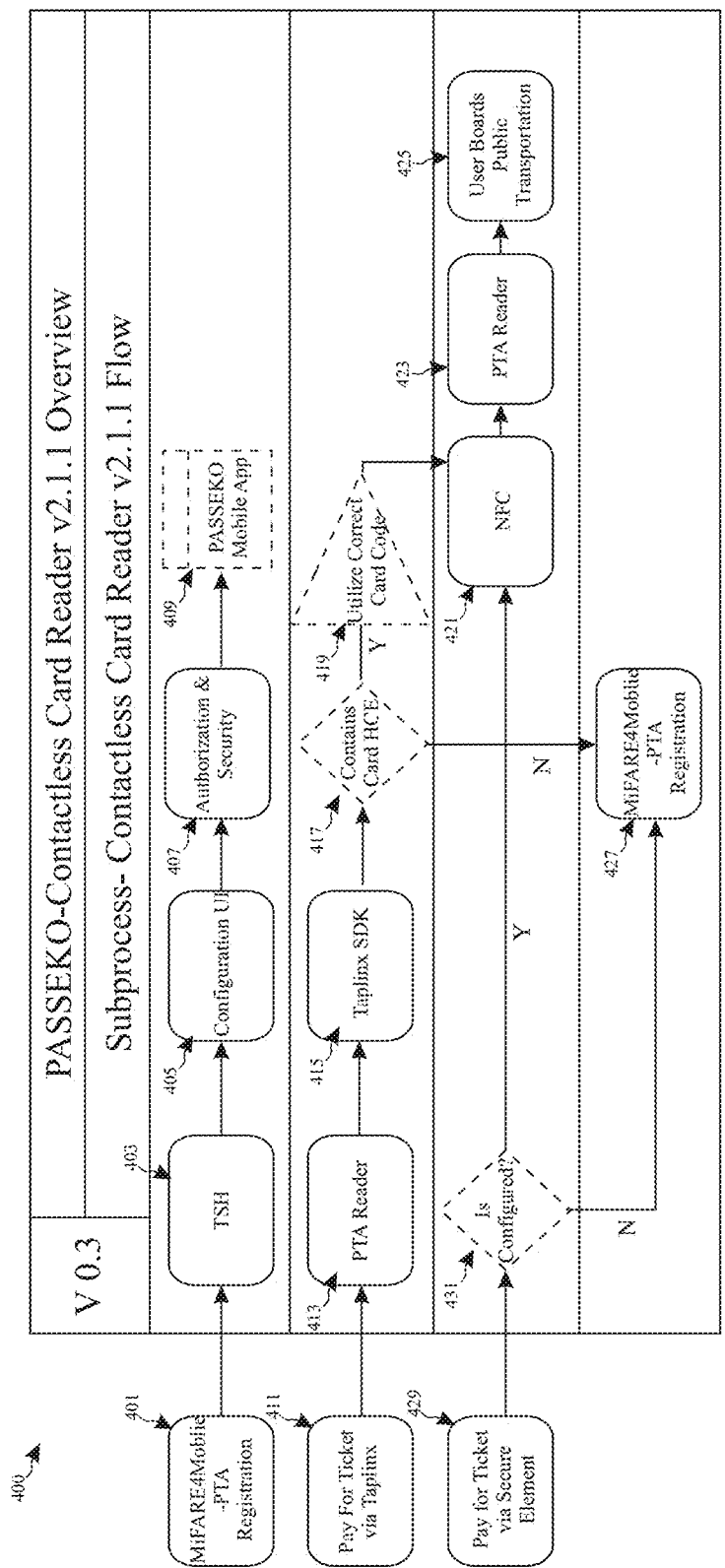
FIG. 4 schematically presents a contactless reader subprocess method flow of the universal fare payment and collection method in accordance with aspects of the present disclosure.

As shown in FIG. 4, a contactless card reader registration is made at 401, at 403 a trusted service hub (TSH) receives and processes the data from the registration and sends the data to a configuration UI at 405. At 407 an authorization and security step is executed before sending processed data to a front-end of the mobile app at 409. At 411 a ticket is paid for via a contactless reader, and the data is received by a PTA reader at 413. At 415, a contactless reader SDK receives data and at 417 it is determined if HCE data is present. At 419, correct card code is utilized and at 421 an NFC sub-system receives data from step 419 that is then sent to a PTA reader at 423 so that at 425 a user boards public transportation. If HCE data is not found, the method continues to register contactless reader information for a PTA at 427. Further, at 429, a ticket is paid for via a secure element. At 431 a correct configuration is determined before sending data to an NFC subsystem at 421. If a configuration is not determined as being correct, the method continues to a registration step at 427.

Further details of FIG. 5 will now be described. At 501 a user registration is received, and at 503 user account management is executed, and at 505 DB2 receives information from step 503 of the user account management. At 507, a card registration is received, at 509 the card registration is managed, and at 511 a bank receives information regarding the managed card. At 513, the mobile app requests a new PTA terminal with a location. At 515, it is determined if an account has enough money. At 517, information from step 515 is passed to a front-end of the mobile app, or if funds are insufficient at 519 a user's credit card is charged. At 521, a user successfully purchases a ticket, at 523 user account management is executed, and at 525 DB2 receives information regarding the user account management. At 527 a user requests a refund and at 529 a ticket management platform receives refund information. At 531 a bank receives information from the ticket management platform. At 502 a web portal is executed or displayed, at 506 customer engagement management is executed, at 533 DB2 receives information regarding the customer engagement management, and at 535 a front-end dashboard of the mobile application receives customer engagement management information from DB2.

Figure 6:
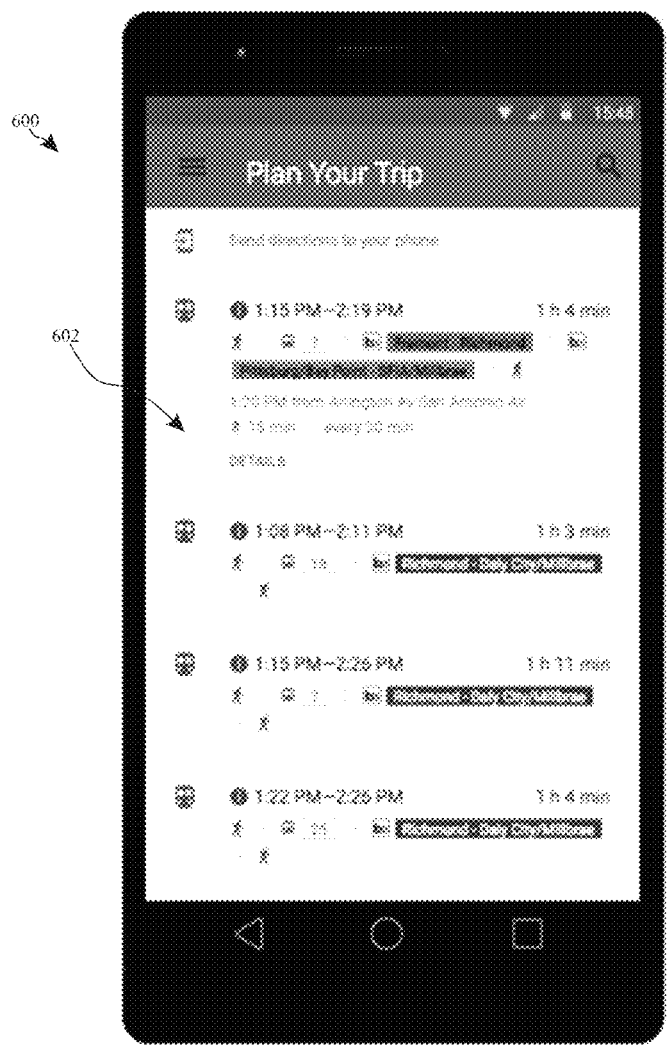
FIGS. 6 and 7 present an example user interface for planning a trip using a mobile app in accordance with aspects of the present disclosure.
Figure 7:
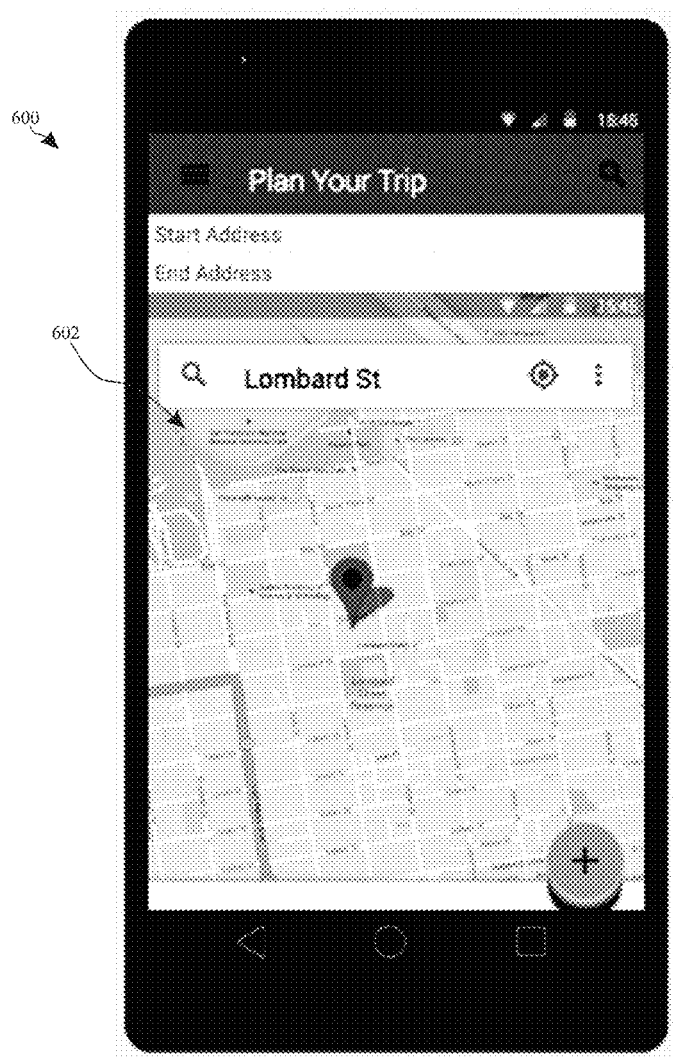

The illustrations of FIGS. 6 and 7 show a mobile device 600 displaying an example user interface 602 for planning a trip using the mobile app disclosed herein. For example, the interface 602 may be used to schedule and plan trips via a plurality of different transport authorities and systems using a single interface or device.

It is to be understood that a user input may be inputted into the system via tapping a touch-screen display, clicking a mouse, or any appropriate user-input method. It is to be understood that as an output, the system may display a graphical user interface (GUI).

It is to be understood that some steps may be executed in more than one of the above described methods, systems, and/or their respective figures. For example, step 202 (FIG. 2) may also be executed at 302 (FIG. 3) and/or 502 (FIG. 5), step 206 (FIG. 2) may be executed at 306 (FIG. 3), step 212 (FIG. 2) may be executed at step 314 (FIG. 3), and/or step 220 (FIG. 2) may be executed at step 320 (FIG. 3).

As non-limiting examples, an appropriate contactless reader or system may be or may include MiFARE4Mobile technology or sub-systems (e.g. TapLinx SDK), an appropriate customer engagement hub may be or may include BOOMERANG or associated sub-systems, and an appropriate electronic ticketing standard microprocessor for contactless smart cards may be CALYPSO technologies or subsystems.

The application may be configured to allow communication between a mobile phone (or contactless card) and a device reader. For example, successful communication authorizes a registered user to board a subway, train, or bus anywhere in the world.

The disclosed solution may include variations. The core technology may be a mobile application running on a specially configured hardware device, which provides a variety of wireless signals through a cellular phone (mobile device) to connect with readers. By utilizing geolocation (GPS) with a mobile device, the mobile application will be able to determine the user's location in relation to nearby public transportation card readers. Upon close proximity to a smart card reader, the mobile application uses an algorithm to determine an optimal wireless contactless mechanism to access the public transport service. A variation of this technology may be or include a contactless card that can be utilized for fare payments with smart card readers.

A web-based portal may be provided by the system, configured to provide back-office support and provide back-end processing of payments, ticket usage, customer analytics, funding/payment sources, refund services, and customer support. The web-based portal may include a series of dashboards for back-office operations. In addition, the portal may provide concierge services to a traveler to aid them in their journey. The portal may utilize GPS information to deliver tailored content and mobile alerts to the customer or user. Offers and incentives may be pushed to users through web/mobile marketing channels.

The mobile application may be targeted toward any appropriate contactless reader. For example, the mobile application may work with Greenfield readers, or any appropriate technology such as Bluetooth, Bluetooth Low Energy, RFID, WiFi, and/or EMV.

The disclosed system provides an ability to use a mobile phone application to board public transportation on a global basis, and this ability is advantageous compared to having to buy tickets or passes throughout the world for each train, bus, and subway service that is used. There are significant economies of scale that make the disclosed universal fare payment service useful. An improved passenger experience is at the heart of the solution. This technology allows tap-and-go in a contactless fashion to pay for, and then enter, public transportation systems.

As such, the disclosed system implements a GPS locator (e.g. via a GPS receiver at a mobile device) to improve passenger experience and wireless communication technologies to more easily enter public transportation systems in a global fashion. Further, the system may be configured to perform all activities for public transportation on a physical device such as a mobile phone.

The system includes a contactless reader subsystem that is configured to interface with Mobile Network Operators (MNOs), or wireless service providers, and provide an interoperable programming interface to remotely provision and manage contactless reading services and configurations in embedded secure elements and/or SIM cards, doing so over the air (OTA). The contactless reader subsystem may comply with international standard ISO/IEC 14443 Type A—a standard used by more than 80% of all contactless smart cards and/or make use of a 13.56 MHz contactless smart card standard. Table 1-1 below lists tag technologies that are supported by the contactless reader subsystem.

TABLE 1-1

| | |
|---|---|
| TagTechnology | The interface that all tag technologies must implement. |
| NfcA | Provides access to NFC-A (ISO 14443-3A) properties and I/O operations. |
| NfcB | Provides access to NFC-B (ISO 14443-3B) properties and I/O operations. |
| NfcF | Provides access to NFC-F (JIS 6319-4) properties and I/O operations. |
| NfcV | Provides access to NFC-V (ISO 15693) properties and I/O operations. |
| IsoDep | Provides access to ISO-DEP (ISO 14443-4) properties and I/O operations. |
| Ndef | Provides access to NDEF data and operations on NFC tags that have been formatted. |
| NdefFormatable | Provides format operations for tags that may be NDEF formattable. |

To gain access to a full suite of terminals, other communication protocols may need to be included such as BLE (Low Energy Bluetooth). BLE operates in the 2.4-2.4835 GHz range with 40-2 MHz channels and a reduced power version of BLE may work well with beacons and mobile payments.

NFC technology may be included in the system. NFC deploys electromagnetic induction between two loop antennas in the unlicensed radio frequency ISM band of 13.56 MHz at rates ranging from 106 to 424 Kbit/s. Protocol for communication may be when devices are within 4 cm of each other. NFC may work on an ISO/IEC 18000-3 air interface at rates from 106, 212 or 424 Kbit/s. NFC standards cover communications protocols based on existing radio frequency identification (RFID) standards including ISO/IEC 14443 and FeliCa. Standards also include ISO/IEC 18092 as well as those defined in the NFC Forum and the GSMA NFC standards within mobile devices.

An electronic ticketing standard for microprocessor contactless smart cards (e.g. Calypso) may be included or implemented in the system. For example, the electronic ticketing standard may allow for interoperability between several transport operators in a same area. The electronic ticketing standard may be a standard that originated in Europe and has since extended to Canada, Mexico and South America. The standard may be reliant on a microprocessor smartcard and RFID for the contactless interface. The ticketing standard may be of ISO/IEC 14443 Type B international standard.

An interoperability application dedicated to interoperability may be run by the system, included, and/or implemented. This technology allows the customers to use a portable object (card, sim card, USB key) in all transport networks that are compatible with the interoperability application. The interoperability application provides the means for access to public transit authorities across municipalities in the same interoperable technology. Secured keys of, or that are compatible with the interoperability application may be shared between all operators that are compatible with the interoperability application. As a non-limiting example, the interoperability application may be Triangle by Calypso, or any appropriate sub-system thereof.

A contactless RFID smart card sub-system, used in electronic money cards may be included in the system. Via the contactless RFID smart card sub-system, encryption keys may be generated dynamically during mutual authentication. The contactless RFID smart card sub-system may be in accordance with ISO/IEC 18092 (NFC) having coding at 212 Kbits/s in 13.56 MHz range, and/or communication can occur within 10 cm. The contactless RFID smart card sub-system technology may allow users to add smart cards into their digital wallets and tap their phone to permit access to any appropriate service described herein, or access to transportation services. Users can then transfer balance from a physical smart card to the digital wallet or create a virtual smart card. As a non-limiting example, the RFID smart card sub-system may be FeliCa, or any appropriate sub-system thereof.

To enable the universal fare payment and collection system, all the above described technologies and services may need to be utilized and aggregated such as the contactless reader technology, BLE technology, NFC technology, interoperability application, RFID smart card sub-system, and/or remote ticket purchasing over HTTP in the mobile app. It is to be understood that any appropriate technology may be utilized and aggregated without departing from the spirit and scope of this disclosure.

The disclosed system overcomes the limitations and solves the problems of the prior art by providing a traveler with a way to ride multiple PTAs from a single application. The disclosed system's competitive advantage lies in the ability to aggregate various PTA accounts and provide the riders access to a multitude of transportation authorities without the need for downloading separate mobile apps per PTA.

The disclosed system will include or utilize a variety of technologies to address the shortcomings in the marketplace as described in the background section. There are a multitude of PTAs that exist in the world, each PTA being equipped with their own set of readers and infrastructure that are integrated via and with the disclosed system.

A first step to choosing a correct technology that is needed at a PTA may include determining a location of a user in real time. As a non-limiting example, the disclosed system may make use of native geolocation abilities from an Android device utilizing Google Maps to obtain a "last known location". Upon obtaining the longitude and latitude of the user when accessing the mobile app, those coordinates will be sent up to a server. Based on a lookup table, the server will send down information related to a particular PTA and what type of communication protocol is required at a given location.

As an example, if a user enters a PTA that requires communication via BLE from the mobile app, a request sent to the server will return to the mobile app all security keys and handshakes required to initiate a bridge to the PTA reader. The reader could also be a contactless reader sub-system reader as described above, in which case the mobile app would utilize a contactless reader mobile SDK for the mobile app to communicate to the reader. The disclosed mobile app may be configured to seamlessly communicate with numerous contactless reader technology readers. As such, a core feature of the system is that it determines which transportation payment technology is to be used at a user's location, and configure the user's device to communicate with a detected payment technology.

One or more of the methods above may include transferring a user's credentials from a contactless reader card into a Secure Element. To allow a user access to a PTA with a contactless reader, those credentials must be first transferred to the Secure Element of the device. This can be done by interfacing with a Trusted Service Hub (TSH). Once contactless reader credentials have been successfully transferred, the rider can simply tap the mobile device against the reader which will transmit the credentials from the Secure Element to the reader. The disclosed mobile app will facilitate an initialization process for a user to transfer the existing contactless reader card into the Secure Element of the device.

The system may be configured to support Host Card Emulation (HCE). Host Card Emulation transfers a physical card into a digital representation. With HCE, the mobile app can make use of the physical card directly from Android code. With Host Card Emulation implemented in the app, the mobile app can communicate with the reader as opposed to having the communication directed to the device's secure element. This would allow the mobile app to gain low level function access to the reader via the Android HCE code.

For those PTAs that do not support any of the aforementioned methods to grant access to the rider, the system may be configured to allow direct HTTP integration into the PTA's back office. For PTAs that have made their ticket purchasing process available via HTTP RESTful API calls, the mobile app will integrate into those HTTP calls in order to grant the rider access into the PTA.

As a non-limiting example, there may be only one registered user account allowed per user, however, depending on the specific implementation, the system may merge or leverage existing accounts at other PTAs to provide contactless tap and go access universally.

The server may include, or integrate into a customer engagement hub. For example, the customer engagement hub may help organizations transform their digital business, increasing revenue and customer satisfaction by enabling personalized user experiences and providing organizations a 360-degree view of their customer. With the customer engagement hub in place, the system can establish two-way online communications, provide targeted website offers, add customer-facing services with minimum customization work and stay ready for opportunities as a marketplace evolves. The customer engagement hub integrates sales, billing, e-commerce and CRM solutions to ensure a consistent customer experience no matter the channel. The customer engagement hub component of the system will deal with credit card needs of users, for adding or refunding monies on the mobile application card, and deal with all the account management that comes along with the management lifecycle of a physical credit card.

In some embodiments the methods, tasks, processes, and/or operations described above may be effected, executed, actualized, and/or carried out by a computing system including a tangible computer-readable storage medium, also described herein as a storage machine, that holds machine-readable instructions executable by a logic machine (i.e. a processor or programmable control device) to effect, execute, actualize, carry out, provide, implement, perform, and/or enact the above described methods, processes, operations, and/or tasks. For example, a suitable computing system may be computing system 100 shown in FIG. 1. When such methods, operations, and/or processes are implemented, the state of the storage machine 104 may be changed to hold different data. For example, the storage machine 104 may include memory devices such as various hard disk drives, CD, or DVD devices. The logic machine 102 may execute machine-readable instructions via one or more physical information and/or logic processing devices. For example, the logic machine 102 may be configured to execute instructions to perform tasks for a computer program. The logic machine 102 may include one or more processors to execute the machine-readable instructions. The computing system 100 may include a display subsystem 106 to display a graphical user interface (GUI) or any visual element of the methods or processes described above. For example, the display subsystem 106, storage machine 104, and logic machine 102 may be integrated such that the above method may be executed while visual elements of the disclosed system and/or method are displayed on a display screen for user consumption. The computing system 100 may include an input subsystem 108 that receives user input. The input subsystem 108 may be configured to connect to and receive input from devices such as a mouse, keyboard or gaming controller. For example, a user input may indicate a request that a certain task is to be executed by the computing system 100, such as requesting the computing system 100 to display any of the above described information, or requesting that the user input updates or modifies existing stored information for processing. A communication subsystem 110 may allow the methods described above to be executed or provided over a computer network. For example, the communication subsystem 110 may be configured to enable the computing system 100 to communicate with a plurality of personal computing devices. The communication subsystem 110 may include wired and/or wireless communication devices to facilitate networked communication. As non-limiting examples, the communication subsystem 110 may include a global positioning system (GPS) module or subsystem 112 that includes one or more GPS receivers for determining a location of one or more electronic devices (e.g. a smart phone). The described methods or processes may be executed, provided, or implemented for a user or one or more computing devices via a computer-program product such as via an application programming interface (API).

The system may provide a pass (e.g. PASSEKO Pass) that allows passengers to access such transportation systems using one pass. For example, the PASSEKO Pass may provide its holder access to multiple private and public transportation systems located within one or more counties, cities, states, countries, and importantly access to public transportation managed and operated by different public transport authorities (PTAs) nationwide and worldwide.

Therefore the disclosed system allows global travelers to access various transportation systems in a ubiquitous fashion. This solution enables a global traveler to purchase transportation system services throughout the world using a mobile application or contactless card. The system may utilize contactless access technologies for smart card readers, providing contactless convenience to users.

Travelers are provided access to transit systems including passenger rails, subways, buses, trolleybuses, rapid transit (metro, subway, underground), light rail (tramways), passenger ferries, high-speed rails, taxis, taxicabs, carpooling, drivers for hire, water taxis, cruise ships, rental cars, rental bikes, rental self-driving cars, share taxis, rental yachts (i.e. recreational boats or ships), rental private aircraft, and all transportation network companies.

One embodiment of the PASSEKO Pass will provide car drivers access to parking and also allow drivers to pay for toll roads (i.e. public or private roadways also known as turnpikes or tollways). Passengers may also be allowed access to commercial aircraft. The PASSEKO Pass may further provide access to libraries, buildings, gated communities, car garages, and banking services, and access to paid events or areas like stadiums, sports arenas, and concerts nationwide and worldwide.

With respect to toll roads, the herein disclosed contactless payment method may include readers as part of a toll road infrastructure to monitor lanes within a roadway. The universal fare payment and collection system or mobile application may integrate with any appropriate technology to listen for a signal that will be sent by way of a contactless reader within a particular area. The universal fare payment and collection system's solution will follow any appropriate communication protocol(s) to integrate with various road telematics vendors that provide existing reader solutions (e.g. Kapsch, Siemens, Thales, and Cubic).

With respect to passenger rails, the universal fare payment and collection system or mobile application will enable rail passengers to use their mobile devices to purchase a railway ticket and use the mobile app as a smart ticket. The ticket may be presented as a QR code on the face of the phone, which may then be received by a conductor who will have a QR reader/scanner to receive a ticket through the system. This configuration may be used with passenger railways that do not have contactless entry gates to board their railway system. When entry gates are utilized, the existing contactless readers or systems will be integrated with the universal fare payment and collection system or mobile application for these passenger rail configurations. In this case, the universal fare payment and collection system mobile application will integrate with a contactless reader through the use of any of the herein described contactless reader technology systems. This will allow entry to the passenger train in a contactless fashion. In addition, the universal fare payment and collection system mobile application can utilize ApplePay, Android Pay, or EMV in an automated fashion depending on the reader configuration utilized by a railway system. When available, the universal fare payment and collection system mobile application may utilize distance-based pricing. The mobile application may require entry and exit readers to be configured at each stop, to accommodate distance-based pricing for railway travel.

With respect to subways, the contactless reader technology system may provide near field communication (NFC) to support contactless access through the universal fare payment and collection system mobile application to contactless readers or systems utilized within subway systems on a world-wide basis. The universal fare payment and collection system mobile application may utilize this technology to enable riders to board passenger rails when passing through an entry gate having a contactless reader. In addition, the universal fare payment and collection system mobile application can utilize ApplePay, Android Pay, or EMV in an automated fashion depending on a reader configuration utilized by a subway system. When available, the universal fare payment and collection system mobile application may utilize distance-based pricing. The mobile application may require entry and exit readers at each stop, within the transportation system configuration, to accommodate distance-based pricing for subway travel.

With respect to buses, upon entry to a bus, the contactless reader may be positioned near a driver at the front of the vehicle. However, in some cases they may be installed at other entry points on the bus. The contactless reader technology provides near field communication to support contactless access through the universal fare payment and collection system mobile application to contactless readers utilized within buses. In addition, the universal fare payment and collection system mobile application can utilize ApplePay, Android Pay, or EMV in an automated fashion depending on the reader configuration utilized by the bus system. When available, the universal fare payment and collection system mobile application may utilize distance-based pricing. The mobile application may require entry and exit readers at each stop, within the transportation system configuration, to accommodate distance-based pricing for travel by bus.

With respect to trolleybuses, upon entry to a trolley, the contactless readers may be positioned near a driver at the front of the vehicle. However, in some cases they may be installed at other entry points on the trolley. The contactless reader technology provides near field communication to support contactless access through the universal fare payment and collection system mobile application to contactless readers utilized within certain trolleys. In addition, the universal fare payment and collection system mobile application can utilize ApplePay, Android Pay, or EMV in an automated fashion depending on the reader utilized by the trolley operator. In cases where QR code tickets are utilized, then the application will direct the user to purchase the trolley ticket through the mobile app. When available, the universal fare payment and collection system mobile application may utilize distance-based pricing. The mobile application may require entry and exit readers at each stop, within the transportation system configuration, to accommodate distance-based pricing for travel by a trolley.

In respect to metros, subways, or underground rails, the contactless reader technology provides near field communication to support contactless access through the universal fare payment and collection system mobile application to contactless readers utilized within metro systems on a world-wide basis. The universal fare payment and collection system mobile application may utilize this technology to enable riders to board passenger cars when passing through an entry gate having contactless reader. In addition, the universal fare payment and collection system mobile application can utilize ApplePay, Android Pay, or EMV in an automated fashion depending on the reader utilized by a local metro system. When available, the universal fare payment and collection system mobile application may utilize distance-based pricing. The mobile application may require entry and exit readers at each stop, within the transportation system configuration, to accommodate distance-based pricing for metro travel.

With respect to light rail, tramways, and/or high speed rail the universal fare payment and collection system or mobile application will enable light rail passengers to use their mobile devices to purchase a tram ticket and use the mobile app as a smart ticket. The ticket would be presented as a QR code on the face of the phone, which will then be received by a tram conductor who will have a QR reader/scanner to receive the ticket. This approach may be used with light railways that do not have contactless entry gates for boarding. When entry gates are utilized, the existing contactless readers or systems may be integrated with the universal fare payment and collection system or mobile application for these passenger rail systems. In this case, the universal fare payment and collection system mobile application may integrate with a contactless reader through the use of any of the herein described contactless reader technology systems allowing entry to the passenger train. In addition, the universal fare payment and collection system mobile application can utilize ApplePay, Android Pay, or EMV in an automated fashion depending on the reader utilized by a light rail system. When available, the universal fare payment and collection system mobile application may utilize distance-based pricing. The mobile application may require entry and exit readers at each stop, within the transportation system configuration, to accommodate distance-based pricing for light rail travel.

With respect to passenger ferries, the universal fare payment and collection system or mobile application will enable ferry passengers to use their mobile devices to purchase a ferry ticket and use the mobile app as a smart ticket. The ticket would be presented as a QR code on the face of the phone, which will then be received by a ferry attendant who will have a QR reader/scanner to receive the ticket. This approach may be used with ferries that do not have contactless entry gates for boarding. When entry gates are utilized, the existing contactless readers or systems will be integrated with the universal fare payment and collection system or mobile application for these passenger ferry systems. This may include NFC, MIFARE4Mobile, BLE, or Bluetooth. In this case, the universal fare payment and collection system mobile application will integrate with a contactless reader allowing entry to the passenger ferry. In addition, the universal fare payment and collection system mobile application can utilize ApplePay, Android Pay, or EMV in an automated fashion depending on the reader utilized.

With respect to high-speed rail, the universal fare payment and collection system or mobile application will enable high-speed rail passengers to use their mobile devices to purchase a train ticket and use the mobile app as a smart ticket. The ticket would be presented as a QR code on the face of the phone, which will then be received by the conductor, who will have a QR reader to receive the ticket. This approach will be used with railways that do not have contactless entry gates to board high-speed railways. When entry gates are utilized, the existing contactless readers or systems will be integrated with the universal fare payment and collection system or mobile application for these high-speed passenger rail systems. In this case the mobile universal fare payment and collection system or mobile application will integrate with a contactless reader through the use of any appropriate contactless reader technology, allowing entry to the high-speed rail. In addition, the universal fare payment and collection system or mobile application may provide a concierge service that can utilize ApplePay, Android Pay, or EMV as non-limiting examples in an automated fashion depending on the reader utilized by the high-speed railway system. When available, the universal fare payment and collection system or mobile application will utilize distance based or geography based pricing. The mobile application will require entry and exit readers at each stop, within the transportation system. This will accommodate distance-based pricing for high-speed rail travel.

With respect to taxicabs, upon entry to a taxicab, the contactless readers tend to be positioned near the rider. The universal fare payment and collection system or mobile application would provide a concierge service that would utilize ApplePay, Android Pay, or EMV, as non-limiting examples in an automated fashion depending on the reader utilized by the cab and the preferred method of payment by the taxicab operator.

With respect to carpooling or taxipooling, most carpooling groups do not utilize electronic contactless readers. As a result, a branded credit card/debit card of the disclosed universal fare payment and collection system would be utilized and a direct payment would be made to the private driver using that card. That payment may include a service such as Venmo or Zelle for electronic transfer of funds, as non-limiting examples.

With respect to drivers for hire, upon entry to a limousine or private car service, the universal fare payment and collection system or mobile application would provide a concierge service. The application would then direct the user to utilize ApplePay, Android Pay, or EMV as non-limiting examples in an automated fashion depending on the reader utilized by the driver and the preferred method of payment by the operator. If contactless payments cannot be utilized, then the mobile application will recommend through the concierge service that a branded credit card/debit card of the disclosed universal fare payment and collection system would be utilized and a direct payment would be made to the private driver using that card.

With respect to water taxis, most water taxis do not utilize electronic contactless readers. Upon entry to a water taxi, a branded credit card/debit card of the disclosed universal fare payment and collection system would be utilized and a direct payment would be made to the water taxi using that card. A QR code ticket could be utilized if a QR reader is available, which would typically entail a ticket purchase from within in the mobile app.

With respect to cruise ships, the universal fare payment and collection system or mobile application would utilize ApplePay, Android Pay, or EMV, or the like in an automated fashion depending on the reader utilized by the cruise ship. When an NFC contactless ticket reader is being utilized, then the universal fare payment and collection system or mobile application could directly interface with the reader being utilized.

With respect to rental cars, the universal fare payment and collection system or mobile application would utilize ApplePay, Android Pay, or EMV or the like in an automated fashion depending on the reader utilized by the car rental agency. If contactless payments cannot be utilized, then the universal fare payment and collection system or mobile application will recommend, through a mobile-based concierge service, that the universal fare payment and collection system or mobile application branded credit card/debit card be utilized and a direct payment would be made to the rental car agency.

With respect to rental bikes, the universal fare payment and collection system or mobile application would utilize ApplePay, Android Pay, or EMV, or the like in an automated fashion depending on the reader utilized by the rental bike agency. If contactless payments cannot be utilized, then the universal fare payment and collection system or mobile application will recommend, through a mobile-based concierge service, that the universal fare payment and collection system or mobile application branded credit card/debit card be utilized and a direct payment would be made to the rental bike vendor.

With respect to rental self-driving cars the universal fare payment and collection system or mobile application includes the ability to utilize wireless communication to secure a self-driving vehicle. The mobile application will utilize Bluetooth, Bluetooth Low Energy, RFID, WiFi, or EMV depending on the configuration requirements of the rental agency and the reader technology that is available.

With respect to share taxis upon entry to a shared taxicab, the universal fare payment and collection system or mobile application would provide a concierge service that would utilize ApplePay, Android Pay, or EMV or the like in an automated fashion depending on the reader utilized by the cab and the preferred method of payment by the taxicab operator. If contactless payments cannot be utilized, then the universal fare payment and collection system or mobile application will recommend, through the mobile-based concierge service, that the universal fare payment and collection system or mobile application branded credit card/debit card be utilized and a direct payment would be made to the taxi operator.

With respect to rental yachts (i.e. recreational boats or ships), for yacht or boat rental, the universal fare payment and collection system or mobile application would provide a concierge service that would utilize ApplePay, Android Pay, or EMV or the like in an automated fashion depending on the reader utilized by the rental yacht operator and the preferred method of payment by the operator. If contactless payments cannot be utilized, then the universal fare payment and collection system or mobile application will recommend, through the mobile-based concierge service, that the universal fare payment and collection system or mobile application branded credit card/debit card be utilized and a direct payment would be made to the boat operator.

With respect to rental private aircraft, private aircraft rental would be achieved with the universal fare payment and collection system or mobile application by utilizing ApplePay, Android Pay, or EMV or the like in an automated fashion depending on the reader utilized by the aircraft owner/operator and the preferred method of payment. If contactless payments cannot be utilized, then the universal fare payment and collection system or mobile application will recommend, through the mobile-based concierge service, that the universal fare payment and collection system or mobile application branded credit card/debit card be utilized and a direct payment would be made to the aircraft operator.

With respect to buildings (e.g. libraries), rental fees at libraries can be initiated with the universal fare payment and collection system or mobile application utilizing ApplePay, Android Pay, or EMV in an automated fashion depending on the reader utilized and the preferred method of payment. If contactless payments cannot be utilized, then the universal fare payment and collection system or mobile application will recommend, through the mobile-based concierge service, that the universal fare payment and collection system or mobile application branded credit card/debit card be utilized and a direct payment would be made to the library.

With respect to commercial aircraft the universal fare payment and collection system or mobile application will enable aircraft passengers to use their cellular phone to purchase an airline ticket and use the mobile app as a smart ticket. This may include remote ticket purchasing over HTTP in the mobile app. The ticket would be presented as a QR code on the face of the phone, which will then be received by an airline gate attendant who will have a QR reader to receive the ticket.

With respect to banking services, the universal fare payment and collection system or mobile application branded credit card/debit card can be utilized for banking services. When the availability of contactless readers exists, then the universal fare payment and collection system or mobile application will direct the user to utilize ApplePay, Android Pay, or EMV, or the like in an automated fashion depending on the reader implemented within the bank.

With respect to paid events (e.g. stadiums, sports arenas, or concerts), the universal fare payment and collection system or mobile application will enable event attendees to use their cellular phone to purchase an event ticket and use the mobile app as a smart ticket. The ticket would be presented as a QR code on the face of the phone, which will then be received by the gate attendant for the event. The attendant would have a QR reader to receive/scan the ticket. Other contactless technologies can be utilized by the universal fare payment and collection system or mobile application depending on the reader present at the event. Those contactless configurations can include NFC, BLE, Bluetooth, and EMV.

With respect to gated communities, the universal fare payment and collection system or mobile application will enable residents to use their mobile device to enter a gated community. For example, a user may use the mobile app as a remote control or a wirelessly detectable device that is configured to open a gate or door to a community. The gated community may include readers as part of an entry/exit infrastructure to monitor lanes entering and exiting a gate. The universal fare payment and collection system or mobile application may integrate with any appropriate technology to listen for a signal that will be sent by way of a contactless reader within a particular area to operate a gate of the gated community. The universal fare payment and collection system's solution will follow any appropriate communication protocol(s) to integrate with various gated community entry systems.

With respect to garage doors, the disclosed universal fare payment and collection or mobile application will enable residents to use their mobile device to enter a garage. For example, a user may use the mobile app as a remote control or a wirelessly detectable device (e.g. via RFID technology) that is configured to open a garage door. A garage door system may include a receiver that is configured to receive a wireless signal from a mobile device to cause the garage door to selectively or automatically open. Therefore, a garage door system may include a reader that monitors a garage entry way (e.g. driveway). The universal fare payment and collection system or mobile application may integrate with any appropriate technology to listen for a signal that will be sent by way of a contactless reader within a particular area to operate the garage door. The universal fare payment and collection system's solution will follow any appropriate communication protocol(s) to integrate with various garage door systems (e.g. gated access, access control, or access granting technology or systems).

It is to be understood that as referred to herein, the term "ticket" may also refer to a pass or the like, without departing from the scope of this disclosure. Any of the above described ticketing technologies (e.g. NFC technology, contactless card reader technology, or Bluetooth technology) may be referred to as an access granting technology or an access control technology.

Further, it is to be understood that any of the above vehicles (e.g. taxis, carpooling, taxipooling, or self-driving cars) may include a reader inside the vehicles. For example, such a reader may be a co-branded reader specially designed and built to be installed in any of the above vehicles while implementing greenfield projects.

It is to be understood that a mobile device may be any appropriate portable computing device, such as a smart phone, laptop, tablet PC, smart watch, mobile internet devices, wearable computers, personal digital assistants, enterprise digital assistants, handheld game consoles, portable media players, ultra-mobile PCs, and/or smart cards, as non-limiting examples.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A universal fare payment and collection system, the system comprising one or more storage machines holding instructions executable by one or more logic machines to:
    via a traveler's electronic device, employ an interoperability application to schedule, book and plan a trip leg by leg via a plurality of different transportation systems;

via the traveler's electronic device, determine a user location, display nearby transportation systems at the user location, and select a first nearby transportation system;

via the traveler's electronic device, identify a first ticketing technology of the selected first nearby transportation system for a first leg of the trip;

configure the traveler's electronic device for authorizing payment of at least one of a ticket and pass via the first ticketing technology selected from a plurality of different ticketing technologies that are each identifiable by the system as being usable in the selected first nearby transportation system;

via the traveler's electronic device, identify a second ticketing technology of a second nearby transportation system for a second leg of the trip, the second ticketing technology being one of a plurality of ticketing technologies different from the first ticketing technology and identifiable by the system as being usable in the selected second nearby transportation system;

configure the traveler's electronic device for authorizing at least one of a ticket and pass via the second ticketing technology;

wherein the nearby transportation systems are determined via a GPS subsystem.

2. The universal fare payment and collection system of claim 1, wherein after the traveler's device is automatically configured for authorizing at least one of a ticket and pass via the second ticketing technology operations are executable to:

detect an access control technology of an access restricted area; and configure the traveler's electronic device for authorizing access to the access restricted area.

3. The universal fare payment and collection system of claim 1, wherein the first and second ticketing technologies further comprise one of NFC technology, contactless card reader technology, QR code, HTTP API Purchase, EMV credit card, and a Bluetooth technology.

4. The universal fare payment and collection system of claim 1, wherein the instructions are executable to run an algorithm to detect or determine a specific ticketing technology by determining a geographic location of the traveler's electronic device in real time using the geographic location for identifying the specific ticketing technology for a specific transportation system nearby the geographic location of the traveler's electronic device.

5. The universal fare payment and collection system of claim 1, wherein the nearby transportation systems are each in different public transportation authorities.

6. The universal fare payment and collection system of claim 5, wherein the system allows a user to pay for at least one of tickets and passes of each of the transportation authorities.

7. A universal fare payment and collection system, the system comprising one or more storage machines holding instructions executable by one or more logic machines to:

via a traveler's electronic device, employ an interoperability application to schedule, book and plan a trip leg by leg via a plurality of different transportation systems;

via the traveler's electronic device, determine a user location, display nearby transportation systems at the user location, and select a first nearby transportation system;

via the traveler's electronic device, automatically identify a first ticketing technology of a selected first nearby transportation system for a first leg of the trip, the first ticketing technology being one of a plurality of different ticketing technologies that are each automatically identifiable by the system as being usable in a particular transportation system of a plurality of different transportation systems;

automatically configure the traveler's electronic device for initiating a first communication between the traveler's electronic device and the first ticketing technology and authorizing at least one of a ticket and pass in response to the first communication;

via the traveler's electronic device, automatically identify a second ticketing technology of a second nearby transportation system for a second leg of the trip, the second ticketing technology being different from the first ticketing technology, and the second ticketing technology being one of a plurality of different ticketing technologies that are each automatically identifiable by the system as being usable in a particular transportation system of a plurality of different transportation systems;

automatically configure the traveler's electronic device for initiating a second communication between the traveler's electronic device and the second ticketing technology and authorizing at least one of a ticket and pass in response to the second communication;

wherein the second communication has a different protocol than the first communication; and wherein the nearby transportation systems are determined via a GPS subsystem.

8. The universal fare payment and collection system of claim 7, wherein the first and second ticketing technologies are at least one of NFC technology, contactless card reader technology, QR code, EMV credit card, and a Bluetooth technology.

9. The universal fare payment and collection system of claim 7, wherein the instructions are executable to:

run an algorithm to detect or determine a specific ticketing technology among a plurality of automatically identifiable ticketing technologies, the plurality of automatically identifiable ticketing technologies including NFC, BLE, contactless card, EMV credit card, or QR code technologies;

wherein if the ticketing technology is determined as being NFC, the traveler's device configured for NFC communication protocol for initiating an NFC communication between the traveler's device and an NFC reader of a transportation system to authorize at least one of a ticket and pass through the NFC communication;

wherein if the ticketing technology is determined as being BLE, the traveler's device is configured for BLE communication protocol for initiating a BLE communication between the traveler's device and a BLE reader of a transportation system to authorize at least one of a ticket and pass through the BLE communication;

wherein if the ticketing technology is determined as requiring a contactless card, a virtual contactless card is configured on a secure element of the traveler's device for initiating contactless card communication between the traveler's device and a contactless card reader of a transportation system to authorize at least one of a ticket and pass through the contactless card communication;

wherein if the ticketing technology is determined as being EMV credit card, the traveler's device is configured for EMV credit card communication protocol for initiating an EMV credit card communication between the traveler's device and an EMV credit card reader of a transportation system to authorize at least one of a ticket and pass through the EMV communication; and wherein if the ticketing technology is determined as being QR code, the traveler's device is configured for QR code communication for initiating a QR code communication between the traveler's device and a QR code reader of a transportation system to authorize at least one of a ticket and pass through the QR code communication.

10. The universal fare payment and collection system of claim 7, wherein the nearby transportation systems are each in different public transportation authorities.

11. The universal fare payment and collection system of claim 10, wherein the system allows a user to pay for at least one of tickets and passes of each of the transportation authorities.

12. A universal fare payment and collection system, the system comprising one or more storage machines holding instructions executable by one or more logic machines to:
via a traveler's electronic device, employ an interoperability application to schedule, book and plan a trip leg by leg via a plurality of different transportation systems;
via the traveler's electronic device, automatically identify a first ticketing technology of a first nearby transportation system for a first leg of a trip, the first ticketing technology being one of a plurality of different ticketing technologies that are each automatically identifiable by the system as being usable in a particular transportation system of a plurality of different transportation systems;
automatically configure the traveler's electronic device for initiating a first communication between the traveler's electronic device and the first ticketing technology and authorizing at least one of a ticket and pass in response to the first communication;
via the traveler's electronic device, automatically identify a second ticketing technology of a second nearby transportation system for a second leg of the trip, the second ticketing technology being different from the first ticketing technology, and the second ticketing technology being one of a plurality of different ticketing technologies that are each automatically identifiable by the system as being usable in a particular transportation system of a plurality of different transportation systems;
automatically configure the traveler's electronic device for initiating a second communication between the traveler's electronic device and the second ticketing technology and authorizing at least one of a ticket and pass in response to the second communication;
wherein the second communication has a different protocol than the first communication; wherein the nearby transportation systems are determined via a GPS subsystem;
wherein the first and second ticketing technologies are one of NFC technology, contactless card reader technology, QR code, EMV credit card, and Bluetooth technology;
wherein the instructions are executable to run an algorithm to detect or determine a specific ticketing technology for use with a specific transportation system;
wherein the nearby transportation systems are each in different public transportation authorities (PTAs),
wherein the system allows a user to pay for at least one of tickets and passes of each of the transportation authorities.

13. The universal fare payment and collection system of claim 12, wherein the instructions are executable to:
display a schedule of each of the transportation authorities.

14. The universal fare payment and collection system of claim 12, wherein the instructions are executable to:
determine a public transportation authority authorization method.

15. The universal fare payment and collection system of claim 12, wherein the instructions are executable to:
determine a mobile device protocol.

16. The universal fare payment and collection system of claim 12, wherein the instructions are executable to:
determine if an access method is Host Card Emulation (HCE).

17. The universal fare payment and collection system of claim 12, wherein the instructions are executable to:
automatically configure a passenger device for a specific contactless reader of a public transportation authority.

18. The universal fare payment and collection system of claim 12, wherein the instructions are executable to:
determine an access type, wherein the access type is a contactless reader.

19. The universal fare payment and collection system of claim 12, wherein the instructions are executable to:
determine an access type, wherein the access type is at least one of a BLE system, an NFC system, contactless credit card, QR code, and an EMV credit card.

20. The universal fare payment and collection system of claim 12, wherein the instructions are executable to:
determine an access type, wherein the access type is an electronic ticketing standard microprocessor for contactless smart cards.

* * * * *